United States Patent
Tanaka et al.

[19]

[11] Patent Number: 6,157,622
[45] Date of Patent: Dec. 5, 2000

[54] COMMUNICATION APPARATUS AND A METHOD FOR CONTROLLING A COMMUNICATION APPARATUS

[75] Inventors: Fumiko Tanaka, Hyogo-ken; Shinzo Matsubara, Osaka-fu, both of Japan

[73] Assignee: Kabushiki Kaisha Toshiba, Kawasaki, Japan

[21] Appl. No.: 08/927,079

[22] Filed: Sep. 10, 1997

[30] Foreign Application Priority Data

Sep. 11, 1996 [JP] Japan ................................. 8-240151

[51] Int. Cl.[7] .............................. H04B 1/00; H04Q 7/00
[52] U.S. Cl. .......................... 370/312; 370/390; 370/420; 370/432; 340/825.47; 455/518
[58] Field of Search ..................................... 370/250, 259, 370/312, 328, 329, 389, 390, 419, 420, 432, 522, 524; 340/825.44, 825.47; 379/93.01, 93.05, 93.07; 455/507, 517, 518, 519; 709/223, 224, 225, 227

[56] References Cited

U.S. PATENT DOCUMENTS 4,864,559  9/1989  Perlman .................................. 370/390
5,771,352  6/1998  Nakamura et al. ................. 395/200.57
5,959,989  9/1999  Gleeson et al. .......................... 370/390

OTHER PUBLICATIONS

D. Comer, Sec. 17.4 "IP Multicast", Internetworking With TCP/IP, 1:291–292.

*Primary Examiner*—Alpus H. Hsu
*Attorney, Agent, or Firm*—Finnegan, Henderson, Farabow, Garrett & Dunner, L.L.P.

[57] ABSTRACT

A plurality of terminals communicate. One terminal belongs to a plurality of groups of terminals. In the communication apparatus, a terminal information memory stores terminal identifiers. A sending section sends the communication information with the terminal identifiers of other terminals participating in one group to the other terminals. A receiving section receives information sent by the other terminal. A group discrimination section compares the received terminal identifiers with the stored terminal identifiers, and discriminates the group from which the received information was communicated according to the comparison.

17 Claims, 17 Drawing Sheets

| GROUP IDENTIFIER | TERMINAL IDENTIFIER OF THE GROUP |
|---|---|
| G1 | A,B,C |
| G2 | C,D,E,F |

*FIG. 7*

| GROUP IDENTIFIER | TERMINAL IDENTIFIER OF THE GROUP |
|---|---|
| G1 | E,F,G |
| ? | A,B,C |

COMMUNICATION APPARATUS AND A METHOD FOR CONTROLLING A COMMUNICATION APPARATUS

FIELD OF THE INVENTION

The present invention relates to a communication apparatus and a method for controlling a communication apparatus to effectively execute transmission to groups of terminals by identifying each group member in a distributed environment.

BACKGROUND OF THE INVENTION

It is well known that users respectively use terminals, such as a handy terminal, to communicate with each other. In such a case, a terminal identifier to identify its user is initially assigned to each terminal. Each terminal transmits the terminal identifier through a wireless network. As shown in FIG. 1, if a plurality of users holding the terminal approaches each other, each terminal receives the terminal identifier from the other terminals. In FIG. 1, three users can communicate with each other through their respective terminals and the three terminals form a group by wireless network.

In general, in case of multicast transmission to a plurality of terminals through wireless network, a group identifier such as class D of the IP (Internet Protocol) is assigned to a packet header as destination address. FIG. 2 is a block diagram of a multicast communication apparatus (the handy terminal) according to first example of the prior art. In FIG. 2, when the destination address (destination group) is designated by a user information processing section 300, a sending information generation section 320 retrieves the group identifier of the destination group from a terminal information memory section 340. The group identifier is attached to communication sentence as packet header and transmitted through a sending section 350. On the other hand, in the receiving side terminal, a receiving information discrimination section 330 decides whether the group identifier includes the receiving side terminal in order to decide that the receiving packet is addressed to the receiving side terminal. However, in an environment in which a network component is dynamically changed (network unity and network splits occur) or participating terminals of the group are frequently changed, negotiation to reset the group identifier is necessary whenever a group component is changed. Therefore, the above-mentioned method is unsuitable.

As another method for multicast transmission to a plurality of terminals through a wireless network, a multicast address is calculated by the terminal identifiers of the destination terminals. The multicast address is attached to the communication sentence as a packet header and transmitted. In the receiving side terminal, the packet is determined to be addressed to the receiving side terminal by comparing the multicast address with the terminal identifier of the receiving side terminal. FIG. 3 is a block diagram of the multicast communication apparatus according to a second example of the prior art. In FIG. 3, when the destination address (destination terminal) is designated by the user information processing section 300, the sending information generation section 320 calculates the multicast address according to the terminal identifiers of each destination terminal stored in the terminal information memory section 340. The multicast address is attached to a communication sentence as a packet header and transmitted through the sending section 350. On the other hand, in the receiving side terminal, the terminal identifier of the receiving side terminal is compared with the multicast address of the packet header in order to determine whether the receiving packet is addressed to the receiving side terminal. This method is effective to decide the destination address of the receiving packet. However, if the receiving side terminal belongs to a plurality of groups, and the receiving packet is addressed to the receiving side terminal, it is impossible for the receiving side terminal to identify group to which the receiving packet is transmitted.

In order to solve this problem, it is considered that the host application program includes a function to identify the group in which the receiving packet is transmitted. However, even if the group to which the receiving packet is transmitted does not exist in the network, the receiving packet will be supplied to the host application program in the receiving terminal. The host application program must then execute processing for the receiving packet, the processing for which is unnecessary, and the processing efficiency for all communication software decreases.

Furthermore, if the destination group of the receiving packet is not identified by the group management section 302, the packet is not received when group components are changed. For example, assume that three terminals A, B, C form one group, and negotiation for another terminal X to participate in the group is executed among the terminals A, B, C. When negotiation from the terminal X to the terminal A is completed and negotiation from the termanal X to the terminals B and C is not completed, the terminals B and C cannot receive the packet sent by terminal A. Therefore, communication efficiency decreases. In order to solve this problem, it is necessay to inform all group components (the terminals A, B, C) of the change. However, in this case, processing efficiency decreases.

In short, in order to set a unique group identifier on a wireless network, negotiation is first executed among all participating terminals of the group, or a fixed group identifier is set under management of a server. In the distributed environment in which the group component is frequently changed, negotiation is necessary whenever the group component is changed and the communication traffic increases.

SUMMARY OF THE INVENTION

It is an object of the present invention to provide a communication apparatus and a method to effectively execute transmission to groups of terminals by identifying each group in a distributed environment.

According to the present invention, there is provided a communication apparatus, a plurality of terminals mutually able to communicate consisting of a group and a particular terminal as the communication apparatus belongs to a plurality of the groups, comprising; a terminal information memory for storing terminal identifiers for terminals participating in the plurality of groups other than the particular terminal, the terminal identifiers being arranged by group; a sending means for, in case of sending communication information to other terminals participating in one group of the plurality of the groups, sending the communication information with the terminal identifiers of the other terminals participating in the one group; a receiving means for receiving information sent by an other terminal; and group discrimination means for comparing the terminal identifiers received by said receiving means with the terminal identifiers stored in said terminal information memory means, and for discriminating the group in which the received information is communicated according to the result of the comparison.

Further in accordance with the present invention, there is provided a communication apparatus, a plurality of terminals able to communicate with one another consisting of a group of terminals and a particular terminal serving as the communication apparatus belonging to a plurality of groups, comprising: a terminal information memory for storing the group identifier of each group and a terminal identifier of each terminal participating in each group; a sending means for, in the case of sending communication information to other terminals participating in one of the plurality of groups, sending the group identifier of the one group and the terminal identifiers of the one group; a receiving means for receiving the information sent by the other terminal; a group discrimination means for comparing the group identifirer received by said receiving means with the group identifier stored in said terminal information memory means, and for newly registering received a group identifier to said terminal information memory means if the received group identifier does not coincide with stored group identifier; and a terminal identifier comparison means for comparing received terminal identifiers belonging to the received group identifier with stored terminal identifiers belonging to one of the stored group identifiers if the eceived group identifier coincides with one of the stored group identifiers, or if the received terminal identifiers belonging to the received group identifier.

Further in accordance with the present invention, there is provided a communication apparatus, a plurality of terminals able to communicate with one another consisting of a group of terminals and a particular terminal serving as the communication apparatus belonging to a plurality of groups, comprising: a group identifier set means for setting group identifiers by groups of terminals; a terminal information memory for storing the group identifier and terminal identifiers of participating terminals arranged by group; a group information sending means for sending a particular terminal identifier as a source address, and a group identifier and the terminal identifiers to other terminals of the group as group information; a group information receiving means for receiving the group information sent by the other terminal; a group information registration means for comparing the terminal identifiers received by said group information receiving means with the stored terminal identifiers by group, and for, if received terminal identifiers coincide with stored terminal identifiers of one group identifier, registering the relation information that the received group identifier is the same as the one group identifier; a sending means for, in case of sending communication information to the participating terminals of the group to which the particular terminal belongs, sending the terminal information consisting of the group identifier of the group and the particular terminal identifier with the communication information; a receiving means for receiving the terminal information and the communication information sent by the participating terminal of the group; and a group information discrimination means for discriminating the group to which the received information is communicated according to the relation information, the group identifier and the particular terminal identifier of the receiving terminal.

BRIEF DESCRIPTION OF THE DRAWINGS

FIG. 7 is a schematic diagram of a group table according to the first embodiment of the present invention.

DETAILED DESCRIPTION OF THE PREFERRED EMBODIMENTS

Figure 1:
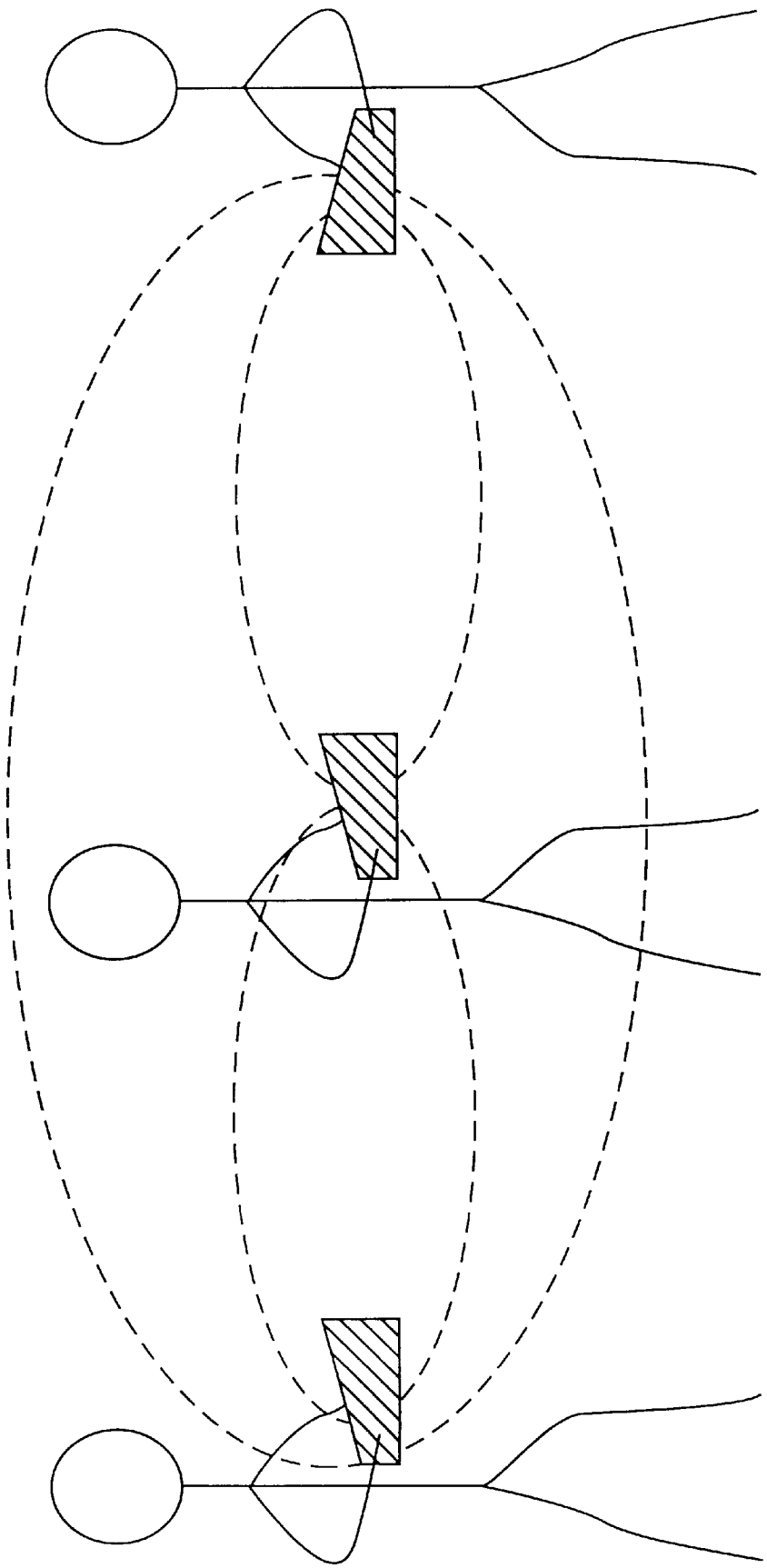
FIG. 1 is a schematic diagram of a plurality of terminals able to communicate with one another.
Figure 2:
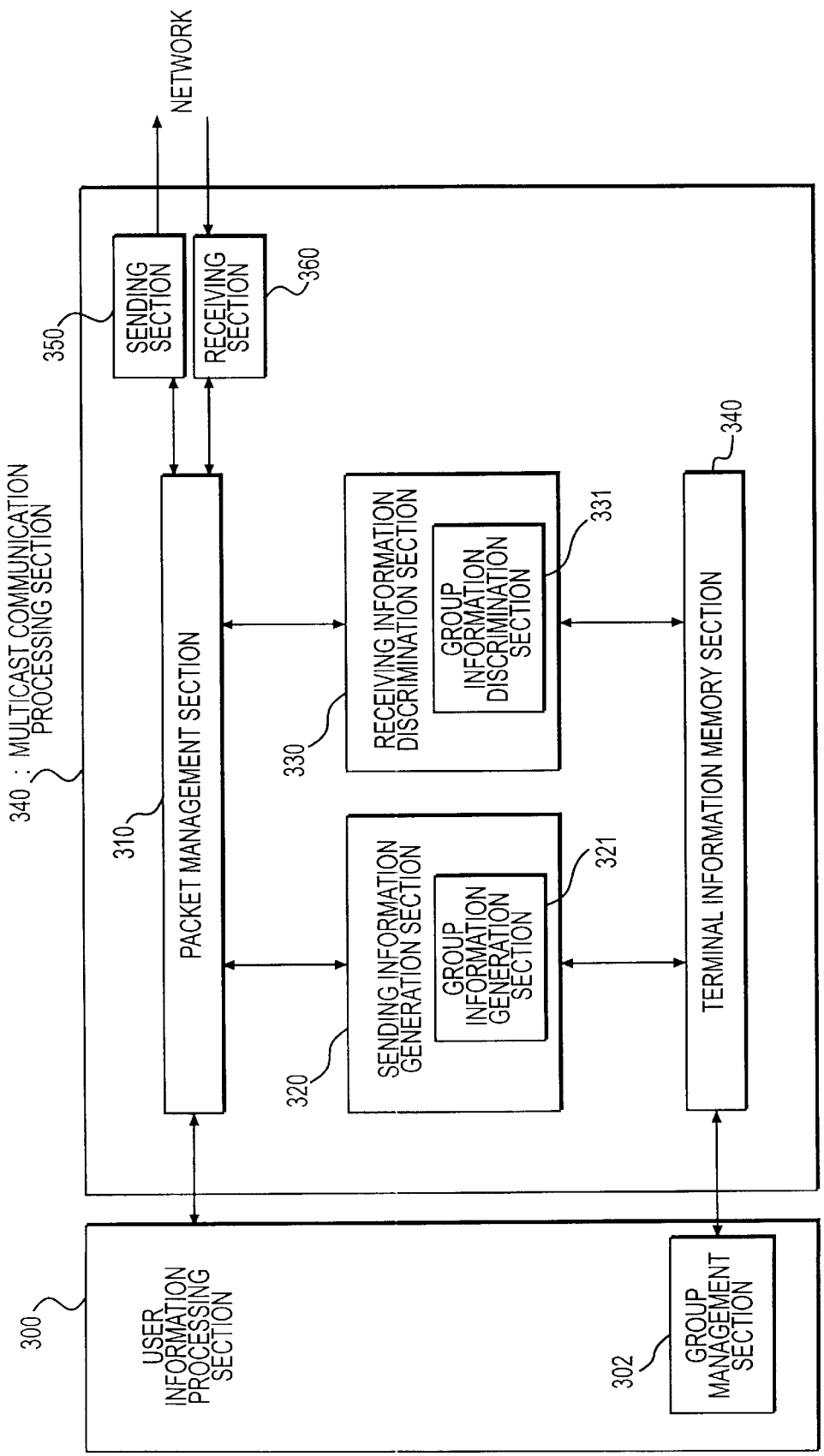
FIG. 2 is a block diagram of a multicast communication apparatus according to first example of prior art.
Figure 3:
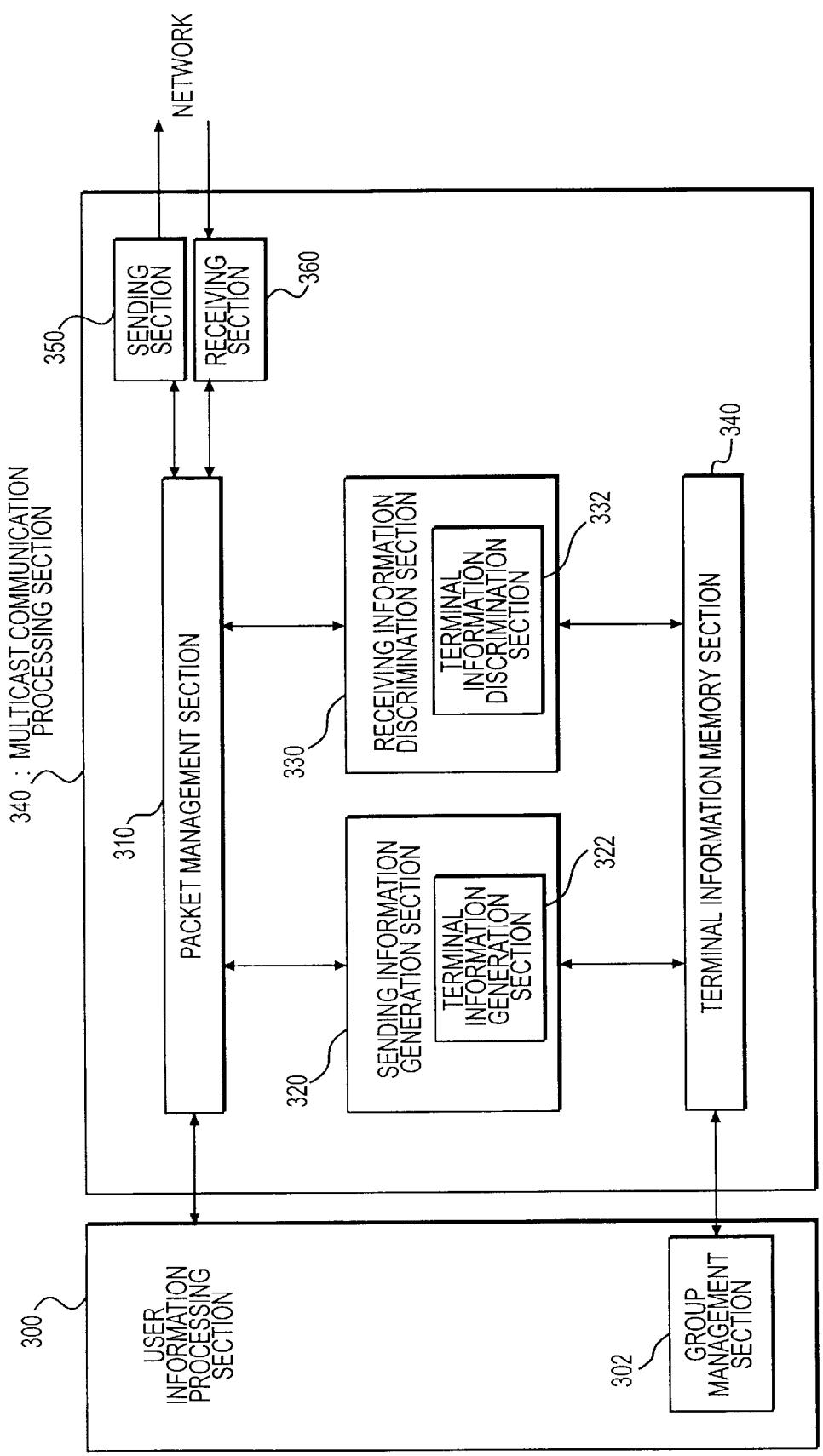
FIG. 3 is a block diagram of a multicast communication apparatus according to second example of prior art.
Figure 4:
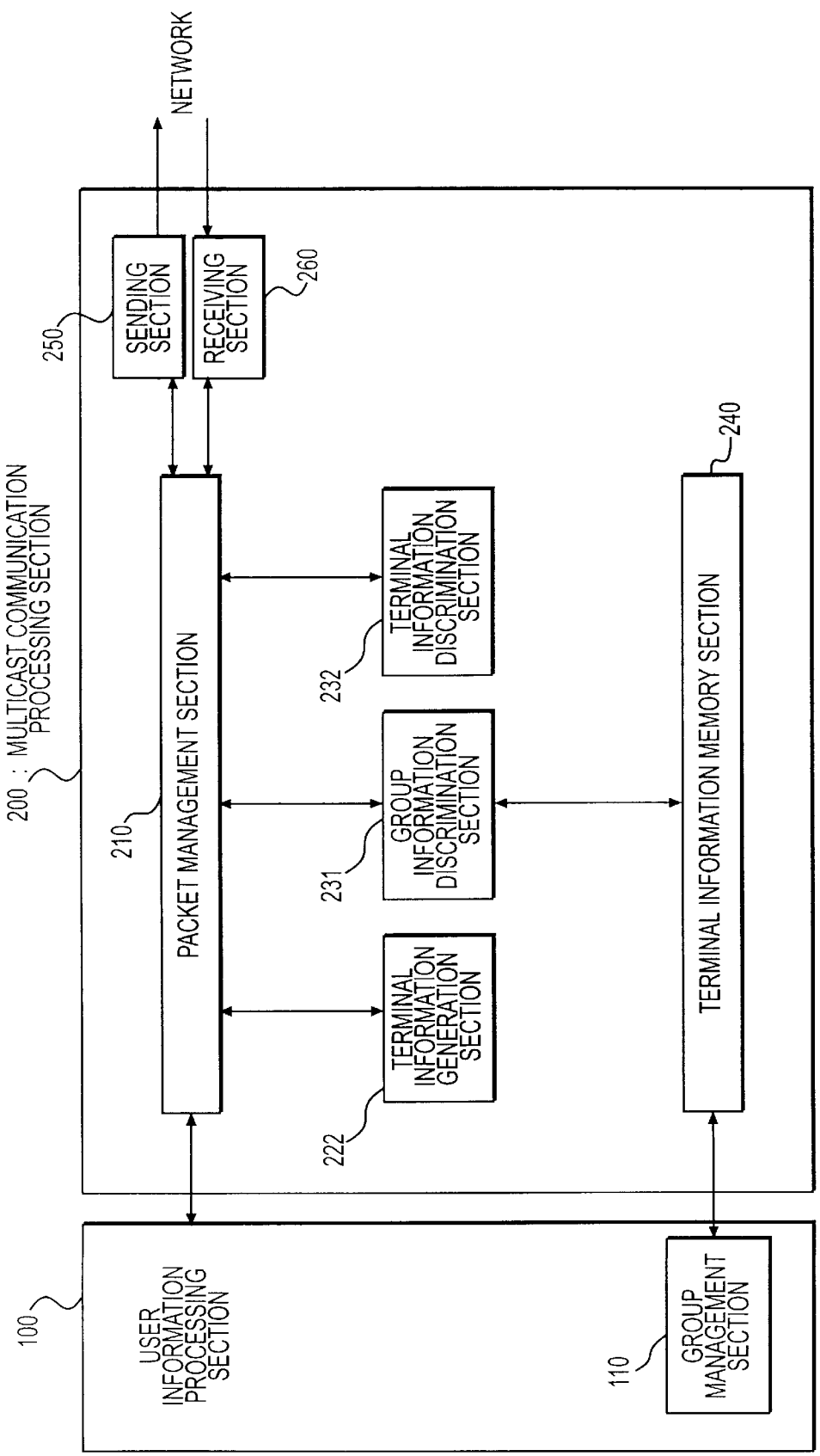
FIG. 4 is a block diagram of a communication apparatus according to a first embodiment of the present invention.

FIG. 4 is a block diagram of the communication apparatus (terminal) according to the first embodiment of the present invention. The communication apparatus is comprised of a user information processing section 100 and a multicast communication processing section 200. A group management section 110 forms the set of terminals indicated by the user that comprise one group from a plurality of terminals able to communicate with one another on a wireless network. The terminal identifiers of the participating terminals of the group are stored in the terminal information memory section 240. When the user information processing section 100 generates a multicast sending order to the group, the packet management section 210 of the multicast communication processing section 200 supplies the terminal identifiers to the terminal information generation section 222 to generate a packet header. The terminal information generation section 222 converts the terminal identifiers to a multicast address and attaches the multicast address to the packet header as a destination address. The packet is sent by a sending section 250 through the network. On the other hand, when a receiving section 260 receives the packet through the network, the packet management section 210 divides the packet into a header and a communication sentence. The header is discriminated by the terminal information discrimination section 232 and the group information discrimination section 231. The terminal information discrimination section 232 decides whether the packet header is addressed to the receiving side terminal (the particular terminal) by comparing the destination address of the header with a particular terminal identifier. If the packet header is not addressed to the particular terminal, the packet is abandoned. The group information discrimination section 231 converts the multicast address to the terminal identifier and compares the terminal identifier with terminal identifiers stored in the terminal information memory section 240 to determine the group in which the packet is transmitted. The group name is outputted from the packet management section 210 to the user information processing section 100.

Figure 5:
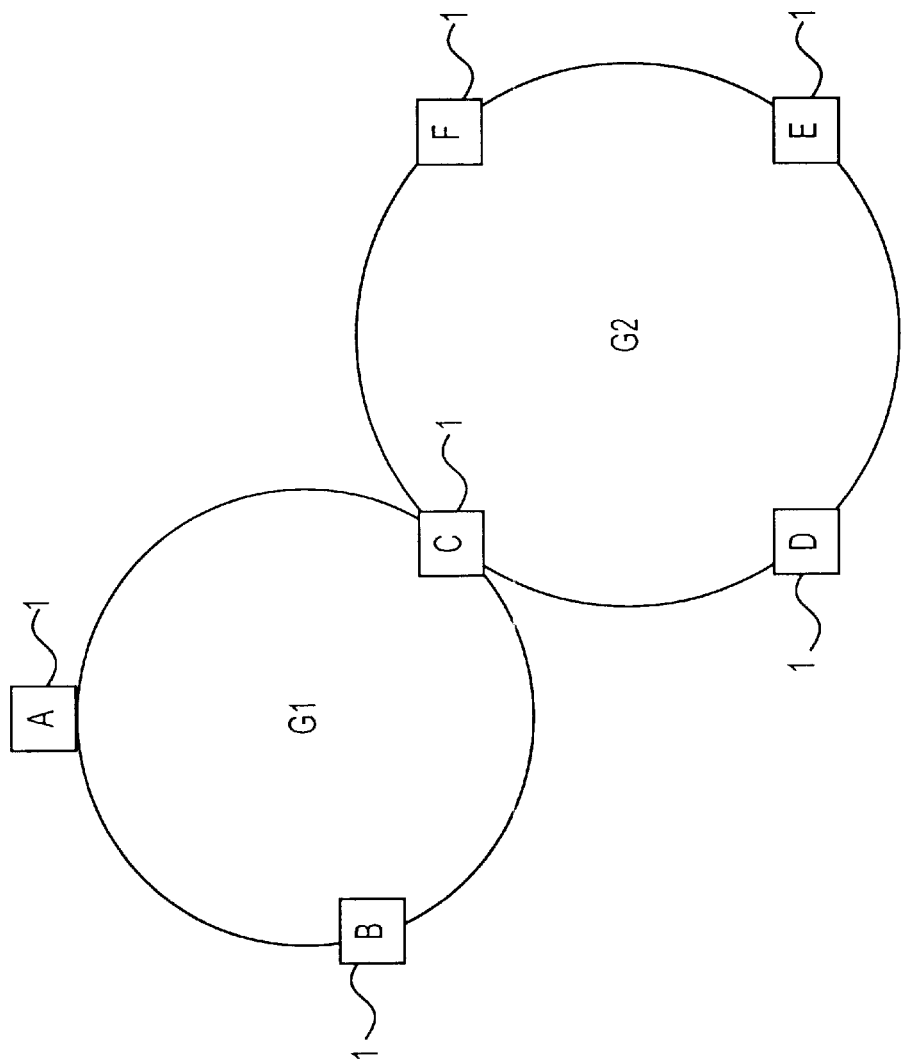
FIG. 5 is a schematic diagram of two groups consisting of a plurality of terminals.
Figure 6A:
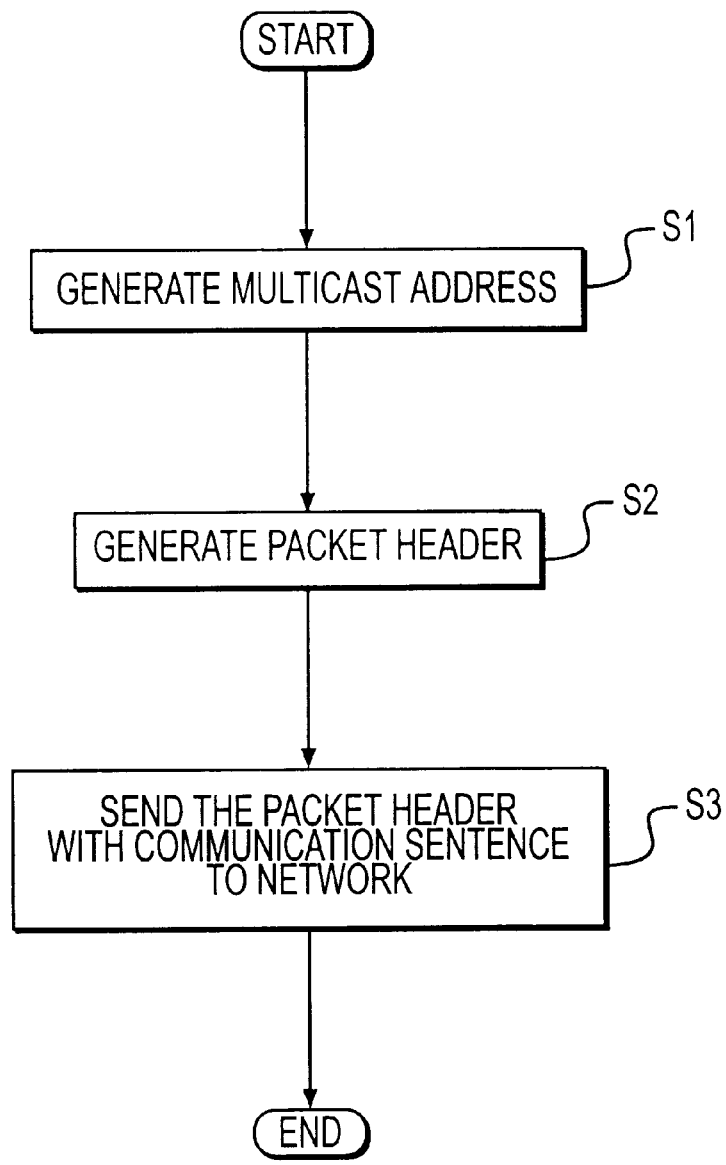
FIG. 6A is a flow chart of a sending method according to the first embodiment of the present invention.
Figure 6B:
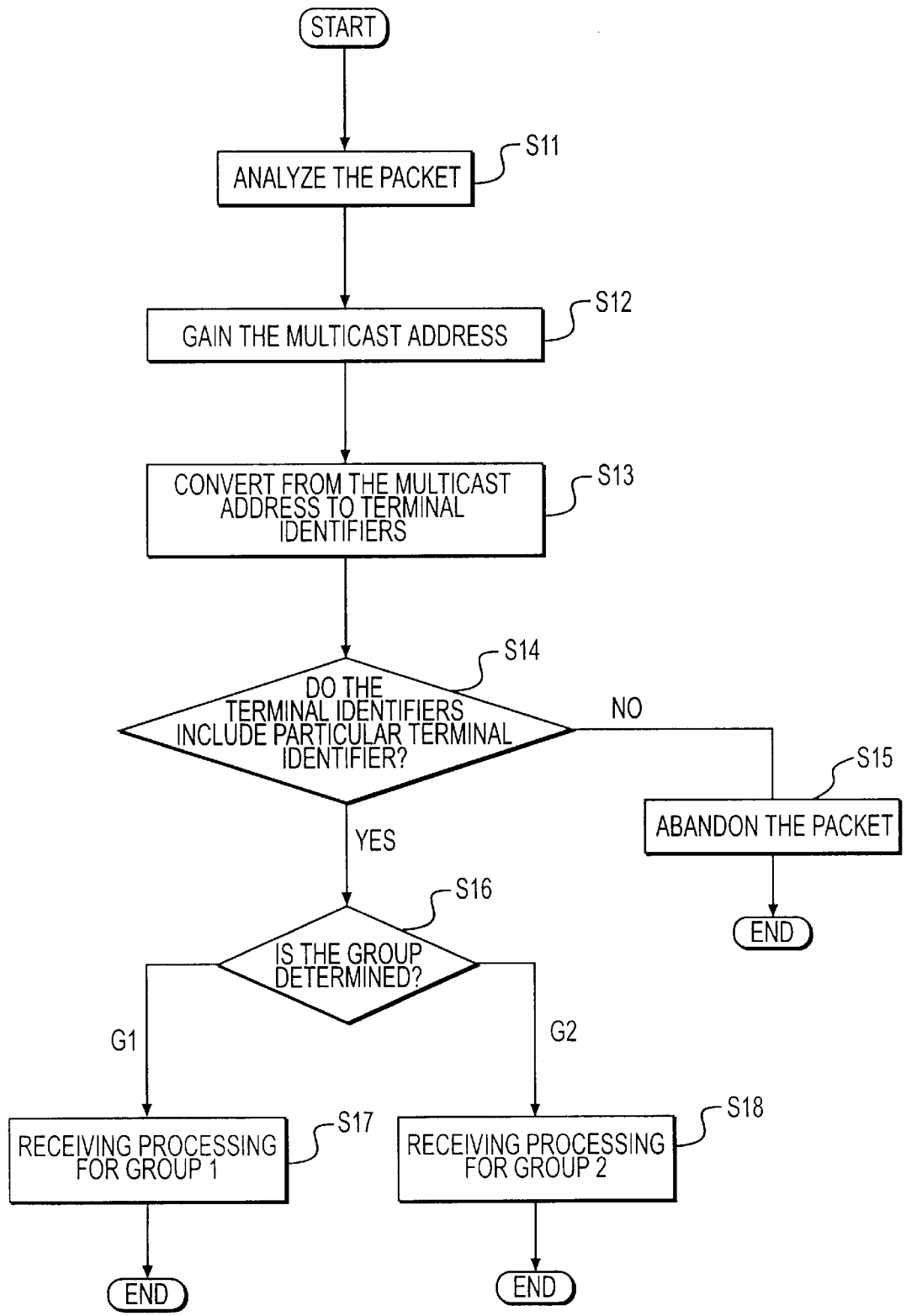
FIG. 6B is a flow chart of a receiving method according to the first embodiment of the present invention.

Next, assume that a plurality of terminals whose construction is disclosed in FIG. 4 approach each other, per instructions from each user, and the two groups are set among the plurality of terminals for a multicast communication. FIG. 5 is a schematic diagram of two group consisting of a plurality of terminals. FIG. 6A is a flow chart of the sending method according to the first embodiment of the present invention. FIG. 6B is a flow chart of the receiving method according to the first embodiment of the present invention. As shown in FIG. 5, six terminals A~F exist on the wireless network. A first group G1 and a second group G2 are set for multicast communication to each group. Assume that transmission from terminal A to the terminals B, C is executed in the group G1 and the terminal identifier is previously assigned to each terminal A, B, C. First, when the user information processing section 100 of the terminal A outputs the sending request that includes terminal identifiers (B, C) of destination address, the sending processing of the multicast communication processing section 200 begins. The packet header is generated in response to the sending request. The multicast address is generated by the terminal identifier as a destination terminal identifier (S1). The packet header consisting of the destination terminal identifier (B, C) and a source terminal identifier (A) is generated (S2) and transmitted with a communication sentence (S3). When the terminal C receives the packet through the network, the packet is divided into the communication sentence and the packet header (S11). The multicast address is extracted from the packet header (S12). The multicast address is converted to the terminal identifiers (S13). The converted terminal identifier is compared with the particular terminal identifier of terminal C (S14). If the converted terminal identifiers do not include the particular terminal identifier of the terminal C, the packet is abandoned (S15). If the converted terminal identifiers include the particular terminal identifier of the terminal C, the converted terminal identifiers are compared with terminal identifiers stored in the terminal information memory section 240 (S16). FIG. 7 is a schematic diagram of a group table consisting of group identifiers and participating terminal identifiers stored in the terminal information memory section 240. As shown in FIG. 7, this packet is determined to be addressed to group G1. In this case, the terminal C belongs to two groups G1, G2. However, by referring to the group table, the communication sentence is sent to the user information processing section of terminal C as information of group G1 (S17). In this way, in the group of the distributed environment, multicast communication is effectively executed even if one terminal belongs to a plurality of groups.

Figure 8:
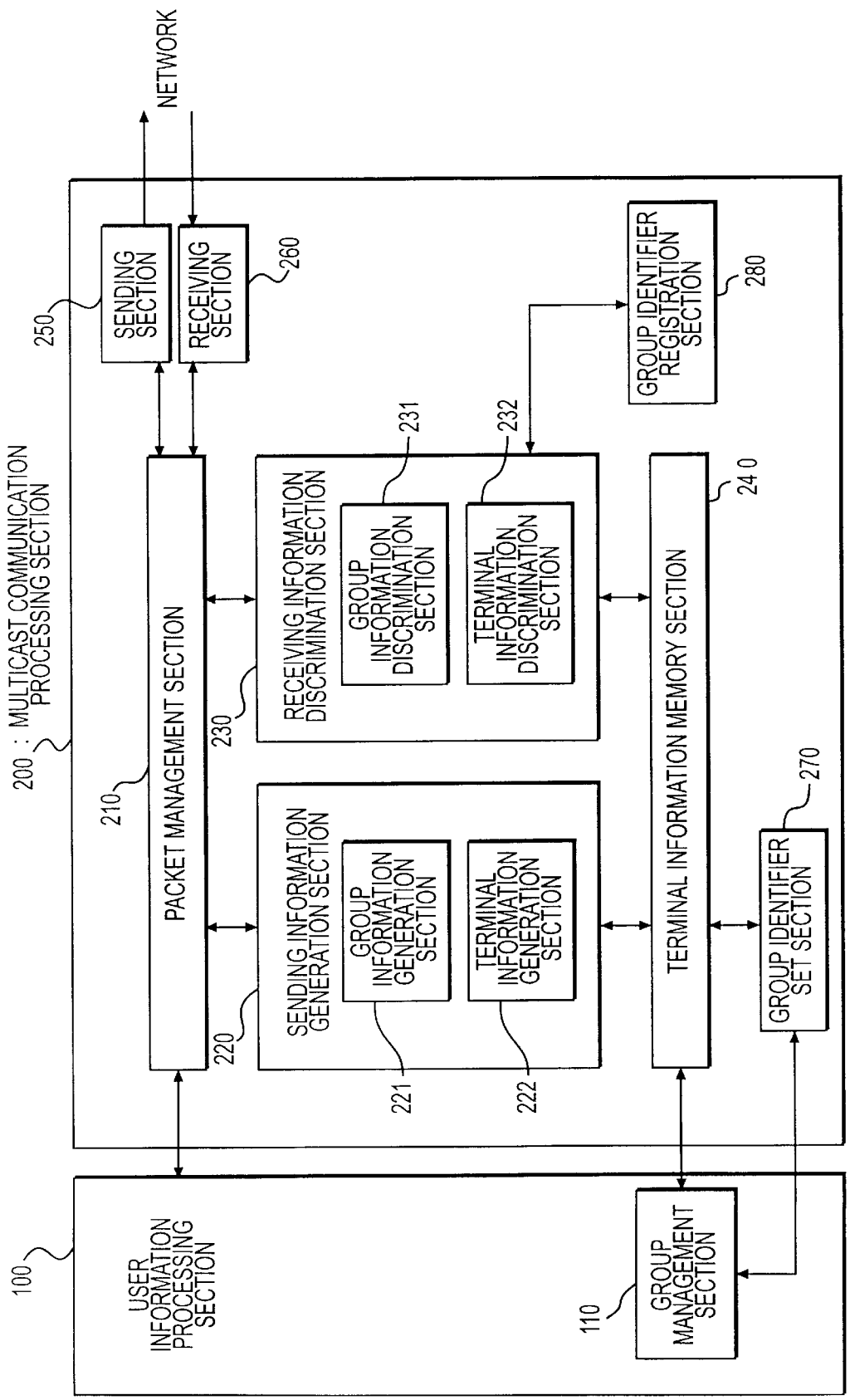
FIG. 8 is a block diagram of a communication apparatus according to a second embodiment of the present invention.
Figures 9, 10:
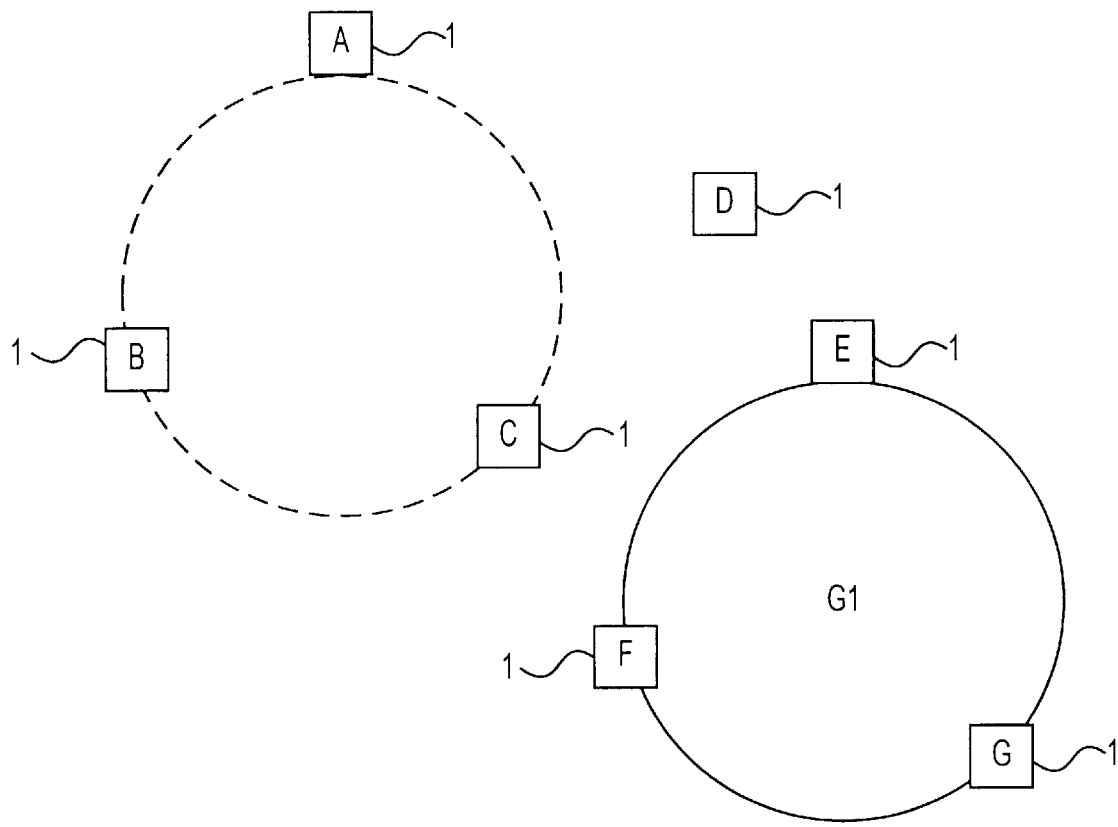
FIG. 9 is a schematic diagram of two networks consisting of a plurality of terminals.
FIG. 10 is a schematic diagram of a group table according to the second embodiment of the present invention.
Figure 11:
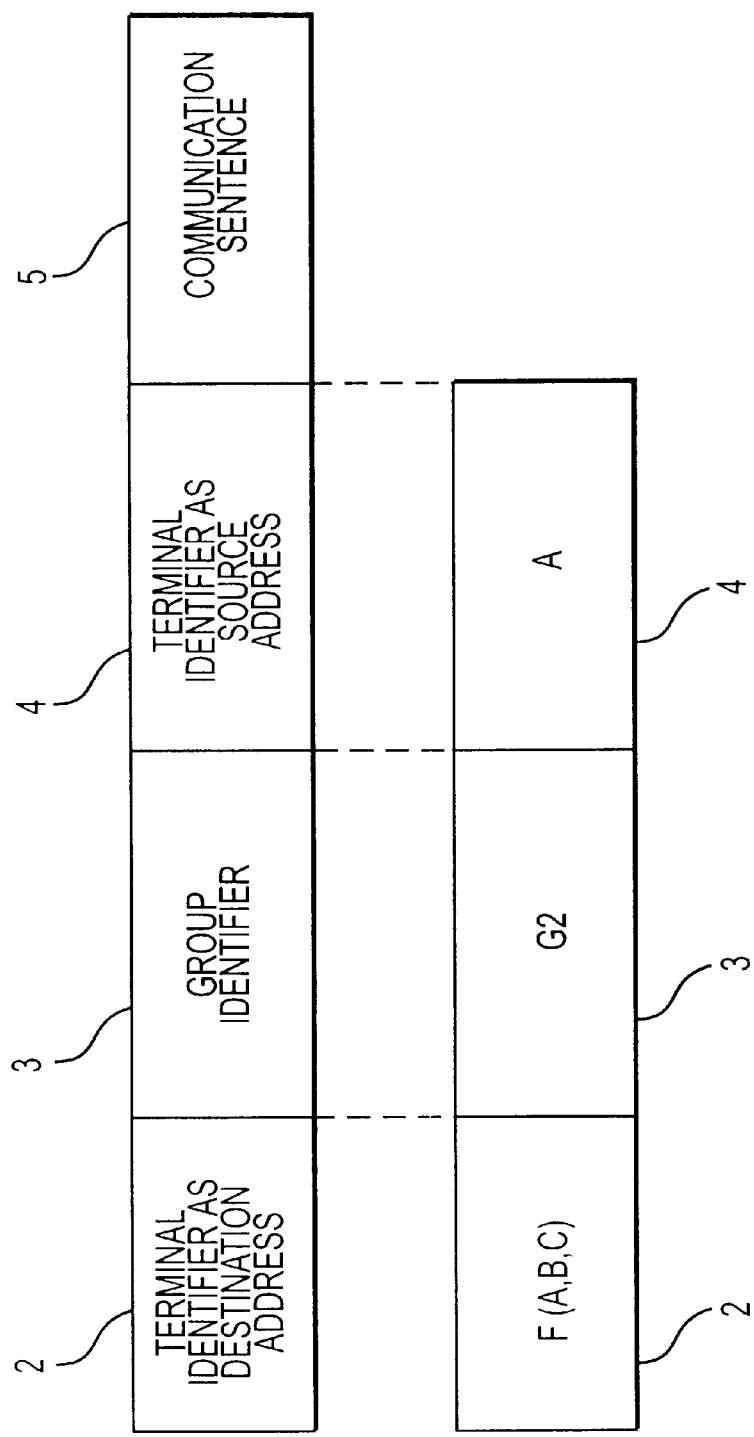
FIG. 11 is a schematic diagram of packet a format according to the second embodiment of the present invention.
Figure 12A:
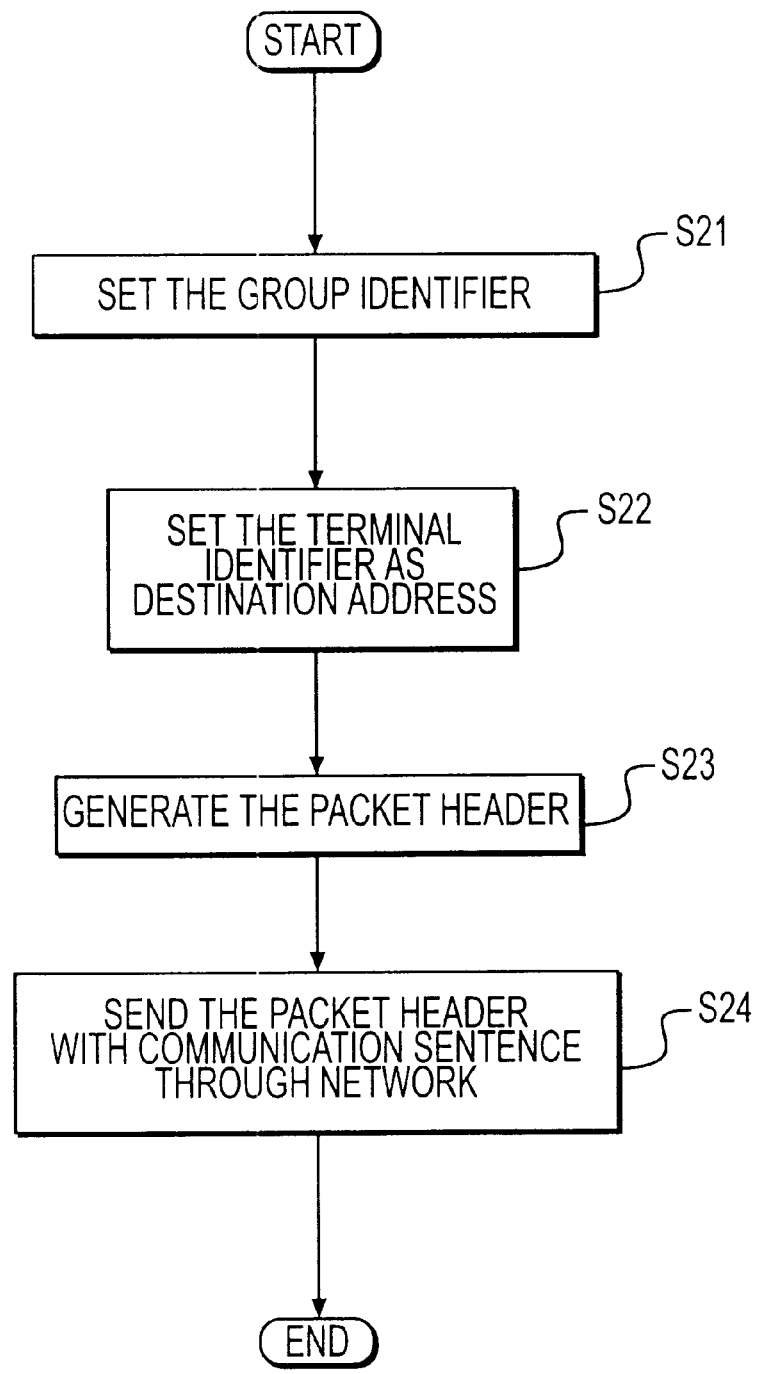
FIG. 12A is a flow chart of a sending method according to the second embodiment of the present invention.

Next, FIG. 8 is a block diagram of the communication apparatus according to the second embodiment of the present invention. In FIG. 8, each section identified by a number that corresponds to a section in FIG. 4, has the same function as in the first embodiment. As shown in FIG. 9, assume that three terminals A, B, C form a new group, and the terminal to take charge of creating the new group is terminal A. First, when the group management section 110 of the terminal A outputs a group creation order to a group identifier set section 270, the group identifier set section 270 assigns a group identifier to the group. The terminal information memory section 240 stores the group identifier and the terminal identifier of participating terminals as a group table. FIG. 10 is a schematic diagram of the group table in the terminal information memory section 240. As shown in FIG. 10, the group identifier G1 and the terminal identifiers E, F, G of the group G1, which already existed in the network, are stored in the group table. FIG. 11 is a block diagram of a packet format. FIG. 12A is a flow chart of the sending method according to the second embodiment of the present invention. In this case, the group identifier set section 270 retrieves the unused group identifier G2 from the terminal information memory section 240 (S21). The group identifier G2 and the terminal identifiers of the terminals A, B, C are newly registered in the terminal information memory section 240 (S22). The new group identifier G2 is transmitted to the group management section 110. In order to transmit the new group identifier G2 to the other terminals of the group, the user information processing section 100 outputs a multicast sending order to the packet management section 210. In same way of the first embodiment, multicast address is generated and sent with the group identifier through the sending section 250 as the packet shown in FIG. 11 (S23, S24). On the other hand, in the receiving side terminal, when the packet is received by the receiving section 260, the packet header is discriminated by the receiving information discrimination section 230. The terminal information discrimination section 232 determines whether the packet header is addressed to the receiving side terminal. The group information discrimination section 231 compares the group identifier of the packet with the group identifiers stored in the terminal information memory section 240. If the group identifier of the packet coincides with one of the stored group identifiers, the terminal identifiers of the packet are compared with terminal identifiers included in the one of the stored group identifiers to determine whether the group identifier is doubly used. If the group identifier of the packet does not coincide with all of the stored group identifiers, the group identifier registration section 280 newly registers the group identifier and the terminal identifiers of the packet to the terminal information memory section 240. After registering the group identifier and the terminal identifiers, if the packet header is not addressed to the receiving side terminal, the packet is abandoned.

As mentioned-above, the group identifier is determined and the multicast communication is executed after that.

In such a multicast communication method, when two groups are formed at the same time and two group identifiers are the same, the group information discrimination section 231 detects that the group identifier is doubly used by referring to the group table. If the group identifier is decided to be doubly used, the group information discrimination section 231 informs the group management section 110 of the double use of the group identifier. In case of the terminals A, B, C, the group management section 110 informs the user of the double use of the group identifier. In addition to this, the group management section 110 of terminal A orders the group identifier set section 270 to assign another group identifier to the group.

Furthermore, in a wireless network of portable communication terminals, plural networks are often linked. In such a case, even if the group identifier is doubly used, the double use is detected.

Figure 12B:
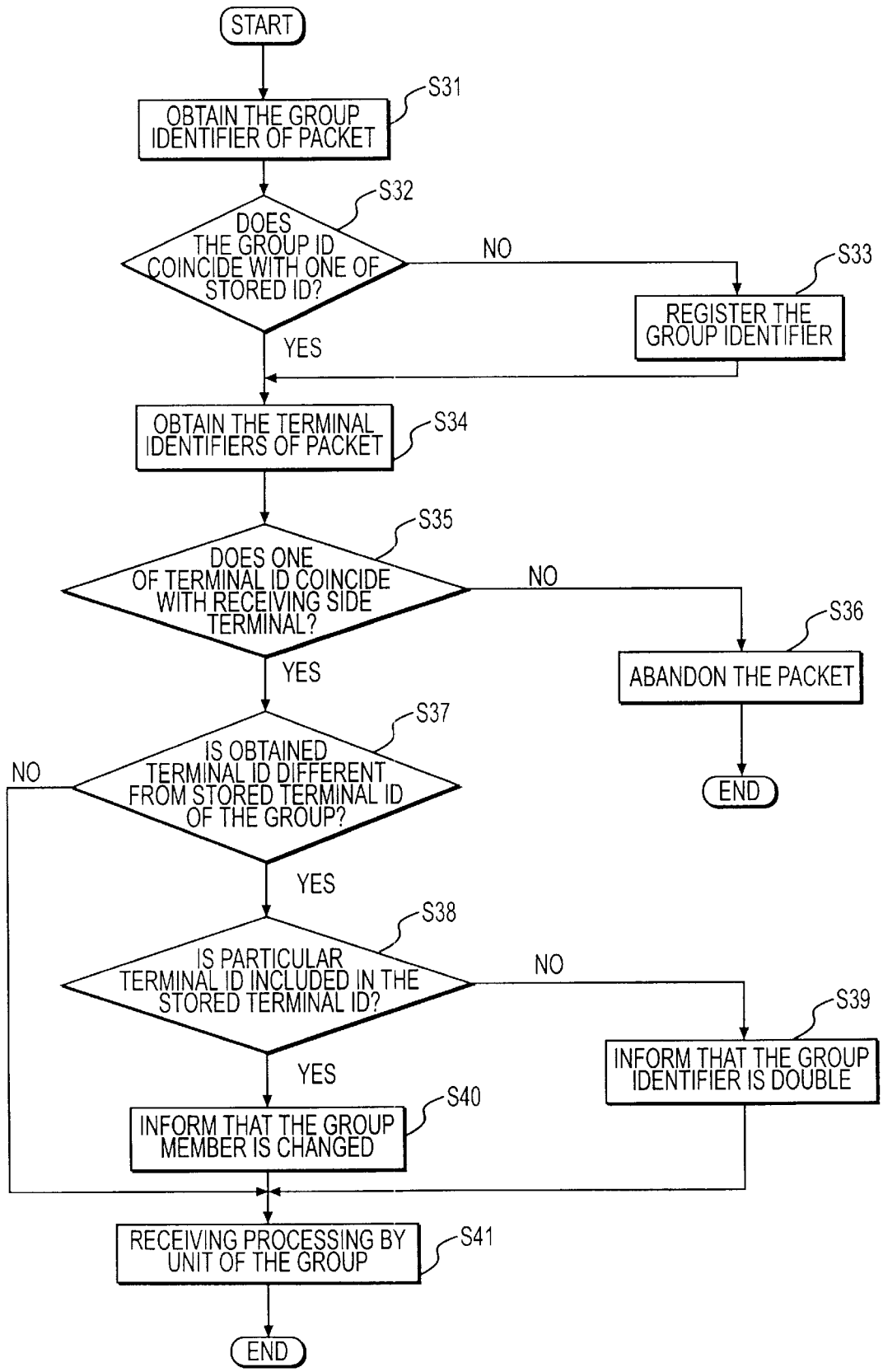
FIG. 12B is a flow chart of a receiving method according to the second embodiment of the present invention.

Now, the processing of the receiving method is explained in detail. FIG. 12B is a flow chart of the processing of the receiving method according to the second embodiment of the present invention. The packet header received by the receiving section 260 is discriminated by the receiving information discrimination section 230. First, the group identifier of the packet is compared with the group identifier stored in the terminal information memory section 240 (S31, S32). If the group identifier of the packet does not coincide with any of the stored group identifiers, the group identifier registration section 280 registers the group identifier and the terminal identifiers of the packet to the terminal information memory section 240 as new group (S33). Next, one of the terminal identifiers of the packet is determined to coincide with a terminal identifier of the receiving side terminal (S34, S35). If each terminal identifier of the packet does not coincide with the terminal identifier of the receiving side terminal, the packet is abandoned because it is not addressed to the receiving side terminal (S36). If one of the terminal identifiers of the packet coincides with the terminal identifier of the receiving side terminal, the packet is addressed to the receiving side terminal. In this case, the terminal identifiers of the packet are compared with the terminal identifiers of the coinciding group identifier stored in the terminal information memory section 240 (S37). If at least one terminal identifier of the packet is different from the terminal identifiers of the coinciding group identifier stored in the terminal information memory section 240, a particular terminal identifier of the receiving side terminal is determined to be included in the terminal identifiers of the coinciding group identifier stored in the terminal information memory section 240 (S38). If the particular terminal identifier is not included, the group identifier of the packet is determined to be doubly used, and the double use of the group identifier is transmitted to the user information processing section 100 (S39). If the particular terminal identifier is included, the member terminals of the group are determined to change, and the change is transmitted to the user information processing section 100 (S40). After transmitting, in the same way as in the first embodiment, the communication sentence with the group information is transferred to the user information processing section 100 (S41).

In this way, when a member terminal of the group is changed or the group identifier is doubly used in the case when plural networks are linked, it is effectively detected. As a method to inform the group identifier, a control flag as attribute may be attached to the packet and broadcasted to the network. In this case, the packet is periodically sent and received.

As mentioned-above, in the distributed environment, in case of an unstable situation for a group component such as the creation of a new group or the linking of a plurality of networks, multicast communication is effectively executed among a plurality of the terminals.

Figure 13:
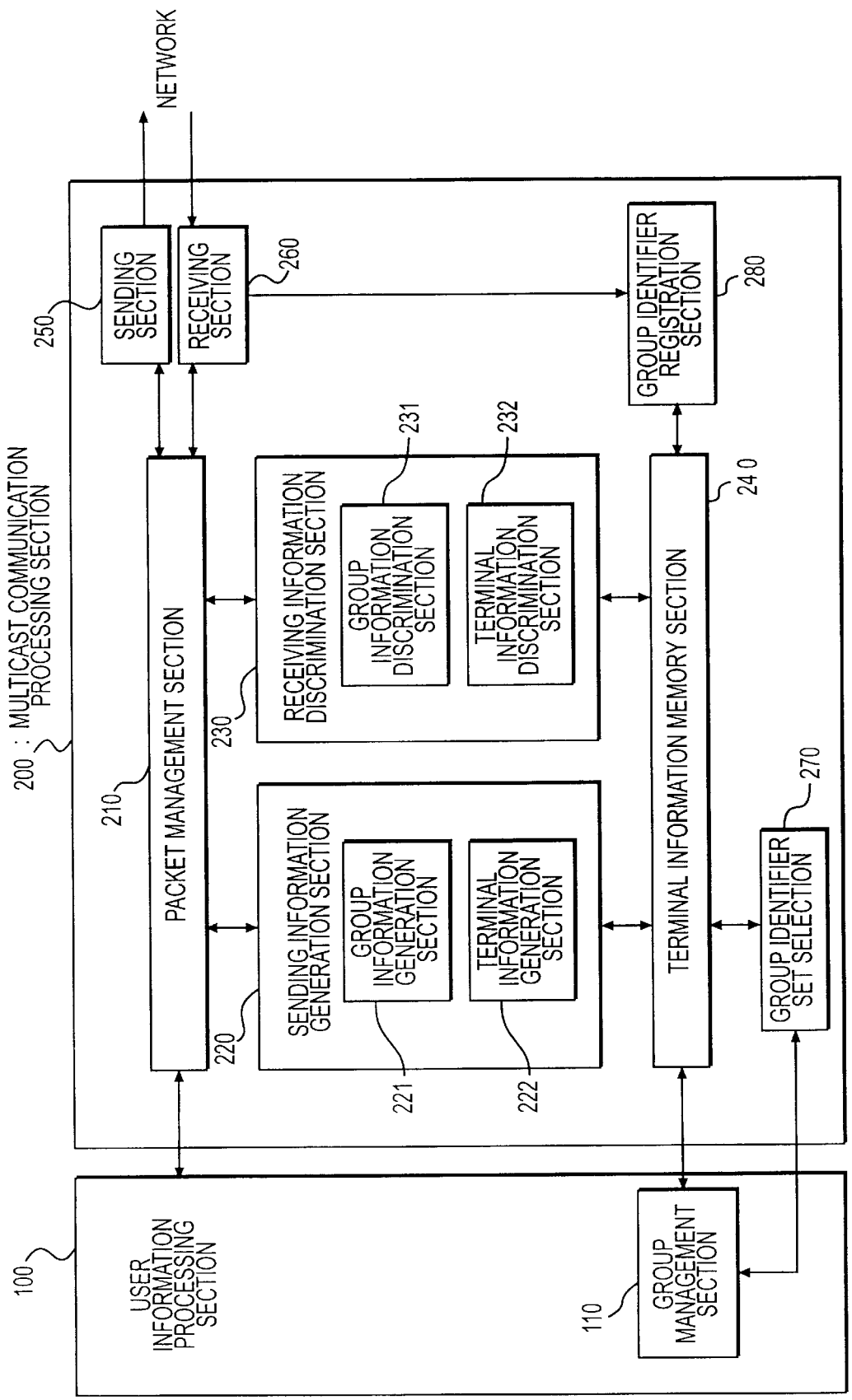
FIG. 13 is a block diagram of a communication apparatus according to a third embodiment of the present invention.
Figure 14:
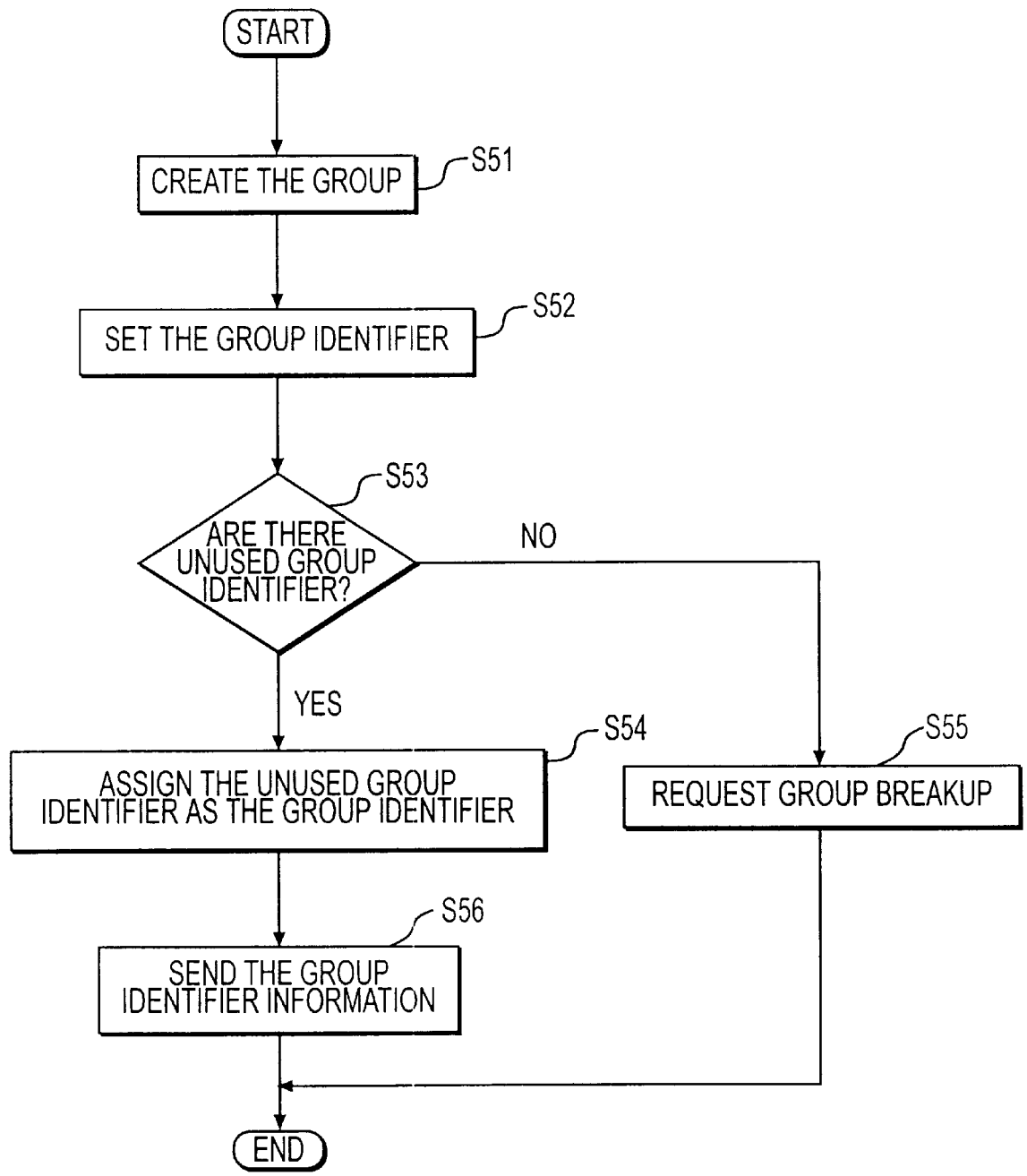
FIG. 14 is a flow chart of the processing of a group identifier setting according to the third embodiment of the present invention.
Figure 15:
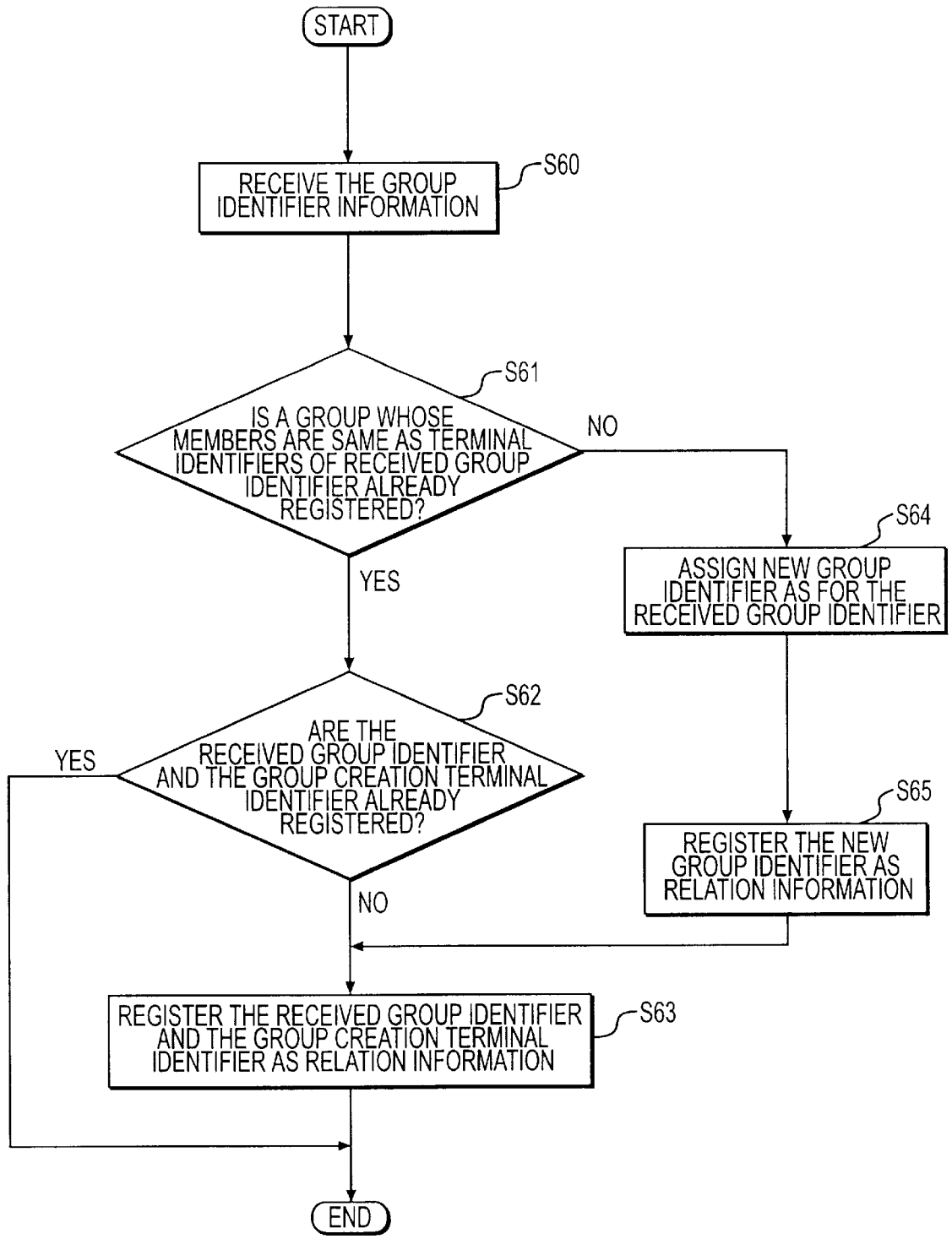
FIG. 15 is a flow chart of the processing of a group identifier management according to the third embodiment of the present invention.

Next, FIG. 13 is a block diagram of the communication apparatus according to the third embodiment of the present invention. FIG. 14 is a flow chart of processing of group identifier setting according to the third embodiment of the present invention. FIG. 15 is a flow chart of the processing of group identifier management according to the third embodiment of the present invention. In FIG. 13, each section whose number corresponds to a number of a section in FIG. 4 and FIG. 8 has the same function as those in the first and second embodiments. First, the user of a particular terminal selects a plurality of terminals including the particular terminal to create a group through the user information processing section 100 (S51). The group management section 110 orders the group identifier set section 270 to assign a group identifier to a created group (S52). The group identifier set section 270 assigns an unused group identifier by referring to the terminal information memory section 240 (S53) and registers the unused group identifier and the terminal identifiers of member terminals in the terminal information memory section 240 (S54). The group identifier is transmitted to the group management section 110. If the unused group identifier does not exist, a group-breakup request is outputted to the group management section 110 (S55). In order to inform member terminals of the group of the new group identifier, group information consisting of the group identifier, the terminal identifiers of member terminals, and a particular terminal identifier (the group creation terminal) is sent to the other member terminals through the sending section 250 (S56).

In the receiving side terminal, when the group information is received by the receiving section 260 (S60), the group information is supplied to a group identifier registration section 280. The group identifier registration section 280 retrieves the terminal information memory section 240 to decide whether the same member terminals of the group are already registered (S61). If the terminal identifiers of the same member terminals are registered as another group identifier (S62), the group identifier and the particular terminal identifier (group creation terminal) of the packet is registered as relational information (S63). If the terminal identifiers of same member terminal are not registered, the group identifier set section 270 assigns a new group identifier of the receiving side terminal to the same group of the group identifier of the packet (S64). The new group identifier (the unique identifier of the receiving side terminal), the group identifier of the packet (the unique identifier of group creation terminal), the terminal identifiers of member terminal of the group, and the particular terminal identifier (the group creation terminal identifier) are registered as relation information in the terminal information memory section 240 (S65).

Next, the sending processing and receiving processing of communication sentence between terminals are explained. In the sending terminal side, when the group management section 110 outputs a multicast sending order for member terminals of the group to the multicast communication processing section 200, the packet management section 210 tells the sending information generation section 220 to generate a packet header. The group information generation section 221 retrieves the group identifier of the indicated group from the terminal information memory section 240. The group identifier and the particular terminal identifier (set-terminal identifier) are attached to the packet header. The terminal information generation section 222 retrieves the terminal identifiers of member terminals of the indicated group from the terminal information memory section 240 and converts the terminal identifiers to multicast address. The multicast address is attached to the packet header as a destination address. The packet is sent from the sending section 250 through the network.

On the other hand, in the receiving side terminal, when the packet is received by the receiving section 260, the packet is divided into a header and a communication sentence by the packet management section 210. The header is discriminated by the receiving information discrimination section 230. The terminal information discrimination section 232 compares the destination address of the header with a particular terminal identifier (the receiving side terminal identifier) to decide whether the packet is addressed to the particular terminal (the receiving side terminal). If the packet is not addressed to the particular terminal, the packet is abandoned. If the packet is addressed to the particular terminal, the group information discrimination section 231 extracts the group identifier and the terminal identifier of the sending side terminal from the header. The group identifier and a sending terminal identifier are matched with the relational information of the terminal information memory section 240 to retrieve a unique group identifier for the receiving side terminal. If the unique group identifier is retrieved, a unique group name (the unique group identifier) for the receiving side terminal is sent to the user information processing section 100 to inform the user. If the unique group identifier does not exist in the terminal information memory section 240, a group name (the group identifier of the packet header) for the sending side terminal is sent to the user information processing section 100.

As mentioned-above, the group identifier of the sending side terminal is determined to be the unique group identifier by the receiving side terminal. The relational information between the group identifier and the unique group identifier is stored beforehand in each terminal. Therefore, communication is effectively executed in the group without determining a fixed group identifier in the group.

Figure 16:
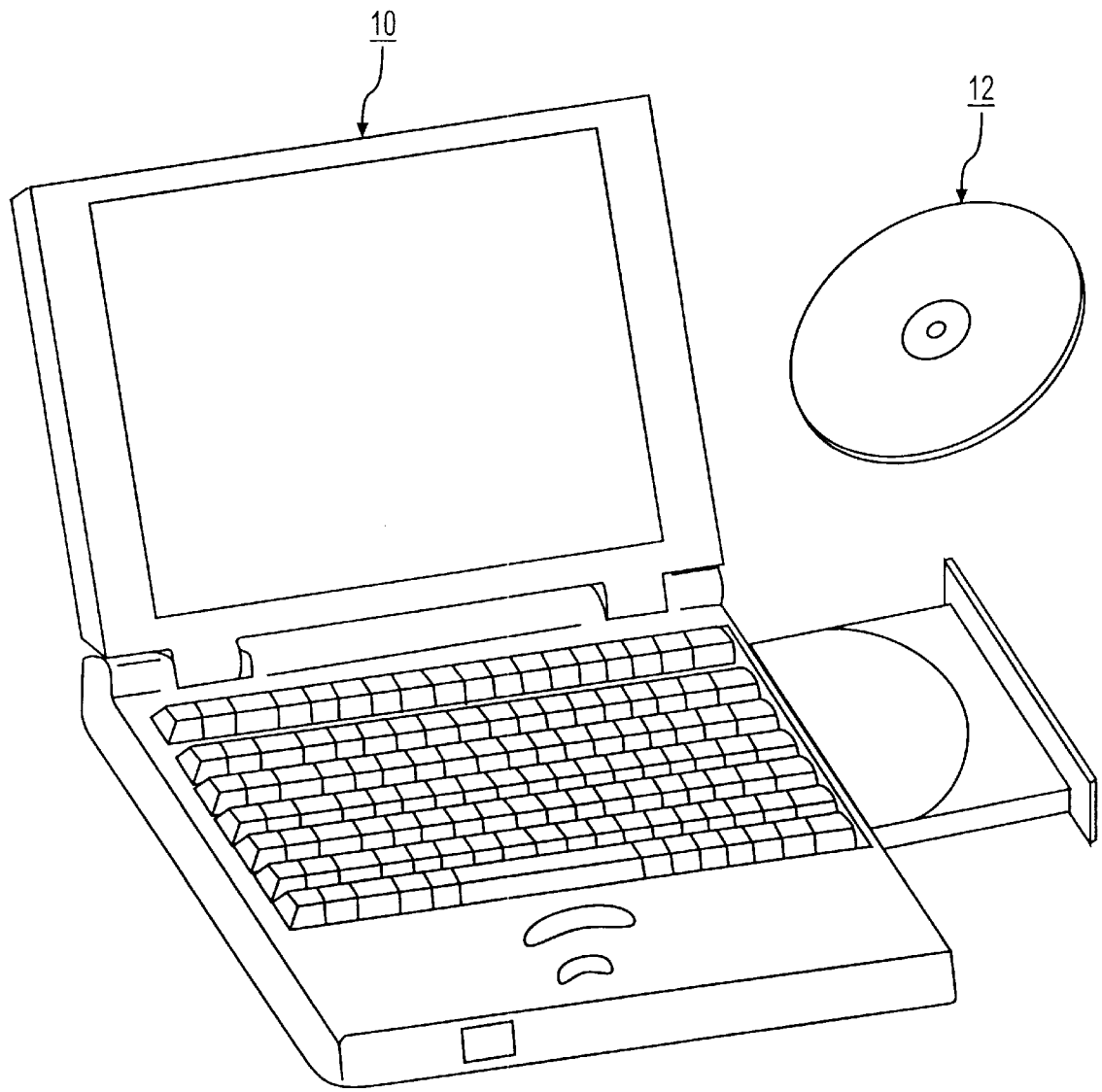
FIG. 16 is a schematic diagram of the terminal and the disk in which the computer program of the communication method of the present invention is stored.

FIG. 16 is a schematic diagram of the terminal and the disk in which computer program of the communication method of the present invention is stored. In the first, second, and third embodiments, the user information processing section 100 and the multicast communication processing section 200 are explained as a construction of the apparatus. However, the contents of flow chart in FIGS. 6A, 6B, 12A, 12B, 14, 15 are stored as a computer program on a recording media 12 such as a FD or CD-ROM, as shown in FIG. 16. In this case, the computer program of the recording media 12 is loaded into a portable communication terminal 10. The portable communication terminal can then execute communication processing illustrated in the first, second, third embodiments.

What is claimed is:

1. A communication terminal for communication with a plurality of other terminals, the communication terminal belonging to a plurality of groups of terminals, the terminal comprising:

a terminal memory for storing terminal identifiers for other terminals in the plurality of the groups, the terminal identifiers being arranged according to each group;

terminal information generation means for generating a multicast address from the terminal identifiers of other terminals in one of the plurality of the groups:

sending means for sending a communication information including the multicast address as a destination address;

receiving means for receiving communication information from another terminal in one group of the plurality of groups; and group discrimination means for converting the multicast address in received information to terminal identifiers, for comparing the converted terminal identifiers with the terminal identifiers of each group stored in said terminal memory, and for discriminating the one group from which the received information is communicated according to the comparison result.

2. The communication terminal according to claim 1, wherein said group discrimination means includes means for deciding whether a terminal identifier of the particular terminal as a receiving side terminal matches one of the converted terminal identifiers as the destination address, and discriminates the group if a match is found.

3. A communication terminal for communication with a plurality of other terminals, the communication terminal belonging to a plurality of groups of terminals, the terminal comprising:

a terminal memory for storing a group identifier for each group and a terminal identifier for each terminal in each group;

receiving means for receiving communication information from another terminal in one group of the plurality of the groups, the communication information including the group identifier of the one group and the terminal identifiers of member terminals of the one group;

group discrimination means for comparing a received group identifier with the group identifiers stored in said terminal memory, and for storing the received group identifier and received terminal identifiers as a new group in said terminal memory if the received group identifier does not coincide with each stored group identifier; and terminal identifier comparison means for, if the received group identifier coincides with one of the stored group identifiers, comparing the received terminal identifiers with stored terminal identifiers belonging to the one of the stored group identifiers, and for, if the received terminal identifiers do not coincide with the stored terminal identifiers belonging to the one of the stored group identifiers, deciding that the received group identifier is doubly used or the member terminal in the one group of the received group identifier has changed.

4. The communication terminal according to claim 3, wherein said terminal identifier comparison means includes means for comparing the received terminal identifiers belonging to the received group identifier with the stored terminal identifers belonging to the one of the stored group identifiers if a terminal identifier of the particular terminal is included in the received terminal identifiers as a destination address.

5. The communication terminal according to claim 4, wherein said terminal identifier comparison means includes means for determining that the received group identifier is doubly used if the terminal identifier of the particular terminal is not included in the stored terminal identifiers belonging to the one of the stored group identifiers.

6. The communication terminal according to claim 4, wherein said terminal identifier comparison means includes means for determining that the member terminal in the one group of the received group identifier is changed if the terminal identifier of the particular terminal is included in the stored terminal identifiers belonging to the one of the stored group identifiers.

7. The communication terminal according to claim 5, further comprising: a group identifier set means for setting a new group identifier to the one group in which the communication information is sent to respective member if the group identifier is decided to be doubly used.

8. A communication terminal for communication with a plurality of other terminals, the communication terminal belonging to a plurality of groups of terminals, the terminal comprising:

group identifier setting means for setting a group identifier for a group consisting of terminals;

a terminal information memory for storing the group identifier and terminal identifiers of the terminals in the group;

group information sending means for sending a terminal identifier of a sending terminal as a source address, the group identifier, and the terminal identifiers of the other terminals in the group to the other terminals in the group as group information;

group information receiving means for receiving group information sent by another terminal;

group information registration means for comparing received terminal identifiers with stored terminal identifiers, and for, if the received terminal identifiers coincide with the stored terminal identifiers of one group identifier, registering relation information which received group identifier is the same as the one group identifier;

sending means for sending communication information to other terminals in the group, the communication information including the group identifier of the group and the terminal identifier of the sending terminal as the source address;

receiving means for receiving communication information from another terminal in one group; and group information discrimination means for discriminating the one group from which received information is communicated according to the relation information matched with the group identifier and the terminal identifier of the another terminal in the received information.

9. The communication apparatus according to claim 8, wherein said group information registration means registers the relation information if the received group identifier and received terminal identifier of the sending terminal are not registered as the relation information in said terminal information memory.

10. The communication apparatus according to claim 8, wherein said group information registration means, if the received terminal identifiers do not coincide with the terminal identifiers of each group stored in said terminal information memory, assigns a new group identifier for the received group identifier.

11. The communication apparatus according to claim 10, wherein said group information registration means registers the new group identifier, the received group identifier, the received terminal identifiers, and the terminal identifier of the sending terminal as the relation information.

12. A method for controlling a terminal in a communication apparatus, the terminal communicating with a plurality of other terminals, and the terminal belonging to a plurality of groups of terminals, comprising the steps of:

storing terminal identifiers for other terminals in the plurality of groups, the terminal identifiers being arranged by each group;

generating a multicast address from the terminal identifiers of other terminals in one of the plurality of the groups;

sending communication information including the multicast address as a destination address;

receiving communication information including the multicast address from another terminal in one group of the plurality of groups;

converting the multicast address in the received information to the terminal identifiers;

comparing the converted terminal identifiers with the stored terminal identifiers of each group; and discriminating the one group from which the received information is communicated according to the comparison result.

13. A method for controlling a terminal in a communication apparatus, the terminal communicating with a plurality of other terminals, and the terminal belonging to a plurality of groups of terminals, comprising the steps of:

storing a group identifier for each group and a terminal identifier for each terminal participating in each group;

receiving communication information including the group identifier and the terminal identifiers of member terminals of one group from another terminal in the one group;

comparing the received group identifier with the stored group identifiers;

registering the received group identifier and received terminal identifiers as a new group if the received group identifier does not coincide with each of the stored group identifiers;

comparing the received terminal identifiers with the stored terminal identifiers belonging to one of the stored group identifiers if the received group identifier coincides with the one of the stored group identifiers; and deciding that the received group identifier is doubly used or the member terminal in the one group of the received group identifier is changed if the received terminal identifiers do not coincide with the stored terminal identifiers belonging to the one of the stored group identifiers.

14. A method for controlling a terminal in a communication apparatus, the terminal communicating with a plurality of other terminals, and each terminal belonging to a plurality of groups of terminals, comprising the steps of:

setting a group identifier for a group consisting of terminals;

storing the group identifier and terminal identifiers of the terminals in the group;

sending a terminal identifier of a sending terminal as a source address the group identifier, and the terminal identifiers of the terminals in the group to the other terminals in the group as group information;

receiving group information from another terminal of one group;

comparing the received terminal identifiers with the stored terminal identifiers;

registering, if the received terminal identifiers coincide with the stored terminal identifiers for one group identifier, relation information that the received group identifier is the same as the one group identifier;

sending communication information including the group identifier of the group and the terminal identifier of the sending terminal as the source address to other terminals in the group;

receiving communication information from another terminal in one group; and discriminating the one group from which received information is communicated according to the relation information matched with the group identifier and the terminal identifier of the another terminal in the received information.

15. A computer readable memory containing computer readable instructions in a communication apparatus including a terminal, the terminal communicating with a plurality of other terminals, and the terminal belonging to a plurality of groups of terminals, comprising:

instruction means for causing the computer to store terminal identifiers for other terminals in the plurality of the groups, the terminal identifiers being arranged by each group;

instruction means for causing the computer to generate a multicast address from the terminal identifiers of other terminals in one of the plurality of the groups;

instruction means for causing the computer to send communication information including the multicast address as a destination address;

instruction means for causing the computer to receive communication information including the multicast address from another terminal in one of the plurality of groups;

instruction means for causing the computer to convert the multicast address in the received information to the terminal identifiers;

instruction means for causing the computer to compare the converted terminal identifiers with the stored terminal identifiers of each group; and instruction means for causing the computer to discriminate the one group from which the received information is communicated according to the comparison result.

16. A computer readable memory containing computer readable instructions in a communication apparatus including a terminal, the terminal communicating with a plurality of other terminals, and the terminal belonging to a plurality of groups of terminals, comprising:

instruction means for causing a computer to store a group identifier for each group and terminal identifiers for member terminals in each group;

instruction means for causing the computer to receive communication information including the group identifier and the terminal identifiers of member terminals in one group from another terminal in the one group;

instruction means for causing the computer to compare the received group identifier with the stored group identifiers;

instruction means for causing the computer to register the received group identifier and received terminal identifiers as a new group if the received group identifier does not coincide with each of the stored group identifiers;

instruction means for causing the computer to compare the received terminal identifiers with the stored terminal identifiers belonging to one of the stored group identifiers if the received group identifier coincides with the one of the stored group identifiers; and instruction means for causing the computer to decide that the received group identifier is doubly used or the member terminal participating in the one group of the received group identifier is changed if the received terminal identifiers do not coincide with the stored terminal identifiers belonging to the one of the stored group identifiers.

17. A computer readable memory containing computer readable instructions in a communication apparatus including a terminal, the terminal communicating with a plurality of other terminals, and the terminal belonging to a plurality of groups of terminals, comprising:

instruction means for causing the computer to set a group identifier for a group consisting of terminals;

instruction means for causing the computer to store the group identifier and terminal identifiers of the terminals in the group;

instruction means for causing the computer to send a terminal identifier of a sending terminal as a source address, the group identifier, and the terminal identifiers of the terminals in the group to the other terminals in the group as group information;

instruction means for causing the computer to receive group information from another terminal of one group;

instruction means for causing the computer to compare the received terminal identifiers with the stored terminal identifiers;

instruction means for causing the computer to register, if the received terminal identifiers coincide with the stored terminal identifiers of one group identifier, relation information that the received group identifier is the same as the one group identifier;

instruction means for causing the computer to send communication information including the group identifier of the group and the terminal identifier of the sending terminal as the source address to other terminals in the group;

instruction means for causing the computer to receive communication information from another terminal in one group; and instruction means for causing the computer to discriminate the one group from which received information is communicated according to the relation information matched with the group identifier and the terminal identifier of the another terminal in the received information.

\* \* \* \* \*